United States Patent
Oonishi et al.

(10) Patent No.: US 10,479,516 B2
(45) Date of Patent: Nov. 19, 2019

(54) AIRCRAFT, AIRCRAFT ENGINE, AND AIRCRAFT ENGINE NACELLE

(71) Applicant: MITSUBISHI AIRCRAFT CORPORATION, Aichi (JP)

(72) Inventors: Tetsuya Oonishi, Aichi (JP); Masahiro Shimojo, Aichi (JP); Takanori Suzuki, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 407 days.

(21) Appl. No.: 15/421,619

(22) Filed: Feb. 1, 2017

(65) Prior Publication Data

US 2017/0240287 A1    Aug. 24, 2017

(30) Foreign Application Priority Data

Feb. 19, 2016    (JP) .................. 2016-029469

(51) Int. Cl.
*B64D 47/02* (2006.01)
*B64D 27/18* (2006.01)
*B64C 7/02* (2006.01)
*B64D 29/06* (2006.01)

(52) U.S. Cl.
CPC ............. *B64D 27/18* (2013.01); *B64C 7/02* (2013.01); *B64D 29/06* (2013.01); *B64D 47/02* (2013.01)

(58) Field of Classification Search
CPC .......... B64C 7/02; B64D 47/02; B64D 29/06; B64D 29/08
See application file for complete search history.

(56) References Cited

U.S. PATENT DOCUMENTS

| | | | | |
|---|---|---|---|---|
| 6,824,175 B2 * | 11/2004 | Porte | ............... | B64D 29/06 244/129.4 |
| 9,856,034 B2 * | 1/2018 | Marche | ............ | B64D 45/0005 |
| 2004/0012212 A1 * | 1/2004 | Pratt | ............... | B64D 29/06 292/341.16 |
| 2006/0038410 A1 * | 2/2006 | Pratt | ............... | B64D 29/06 292/144 |
| 2014/0225380 A1 * | 8/2014 | Gonidec | ............ | B64D 29/06 292/129 |
| 2016/0368616 A1 * | 12/2016 | Aten | ............... | B64D 33/06 |

OTHER PUBLICATIONS

Extended European Search Report issued in Patent Application No. EP 17 15 3783 dated Nov. 9, 2017.

* cited by examiner

*Primary Examiner* — Philip J Bonzell
*Assistant Examiner* — Tye William Abell
(74) *Attorney, Agent, or Firm* — Pearne & Gordon LLP

(57) ABSTRACT

To surely grasp an unlocked state of a cowl member while suppressing cost and time necessary for measures against forgetting of locking of an engine nacelle. An aircraft according to the present invention includes: an engine (3) that includes an engine main body (4, 5) outputting thrust force and an engine nacelle (7) surrounding the engine main body (4, 5); an engine pylon (2) that supports the engine main body (4, 5) to a main wing (1) and axially supports a cowl member (8) to be openable, the cowl member (8) configuring the engine nacelle (7); a locking part (30) that locks the cowl member (8) of the engine nacelle (7) in a closed state; and one or more light emitting sections (15) that are disposed inside the cowl member (8) and show an unlocked state of the cowl member (8).

18 Claims, 9 Drawing Sheets

AIRCRAFT, AIRCRAFT ENGINE, AND AIRCRAFT ENGINE NACELLE

BACKGROUND OF THE INVENTION

Field of the Invention

The present invention relates to an aircraft, an aircraft engine, and an engine nacelle that is opened and closed for maintenance of the engine of the aircraft.

Description of the Related Art

An engine nacelle of an aircraft is divided into two parts along an axis line, and an airframe side cowl member and an outer side cowl member are respectively opened to both sides through hinges that are attached to an engine pylon. Accessories and various gauges that are provided in the engine are maintained while the cowl members are supported in the opened state. Thereafter, rods supporting the cowl members are removed to cause the cowl members to pivot downward. Further, the airframe side cowl member and the outer side cowl member that have moved downward by own weight are brought into contact with each other by a latch handle, and latch members provided in the respective cowl members are locked with each other to lock the cowl members in a closed state.

U.S. Pat. No. 6,824,175 discloses a technology that addresses forgetting of locking of the engine nacelle.

The engine nacelle described in U.S. Pat. No. 6,824,175 includes a cover that covers the latch handle. The latch handle is operated to lock or unlock the cowl member. The cover covers a front surface of the engine nacelle within a wide range over a region in which a plurality of latch handles are disposed at intervals in the axis line direction of the engine nacelle, and the cover is liftable with respect to the engine nacelle. After the latch handles are each operated to lock the cowl member, the cover is laid down toward the engine nacelle. The cover is locked to the engine nacelle while covering the latch handles.

The configuration of U.S. Pat. No. 6,824,175 allows a maintenance crew to notice that the locking operation of the cowl member has not been appropriately performed, based on the cover that serves as an indicator suspended from the engine nacelle.

In contrast, it has been known that a proximal sensor electrically detects a proximity state of the cowl members and a controller that receives a value detected by the proximal sensor determines whether or not the cowl members are locked. When the cowl members are not locked, a warning that indicates the unlocked state of the cowl members is displayed on a device in a cockpit, based on a signal that is transmitted from the controller to a system that manages information necessary for flight.

The cover having a large area as described in U.S. Pat. No. 6,824,175 may not be noticed even though the cover is suspended from the engine nacelle. The maintenance crew may not notice the suspended cover and may not grasp the unlocked state of the cowl member unless the maintenance crew directs attention to the cover located below the engine nacelle.

In contrast, when the proximity state of the cowl members is electrically detected and the warning is displayed on the device in the cockpit to call crews' attention, it is necessary to provide redundancy to a system from detection of the proximity state, determination of the locked state, and display of the warning. It is necessary to design and develop a unit including a controller, wirings, and the like in consideration of such redundancy, and to modify a part of an existing system in some cases. This necessitates much cost and time.

Accordingly, an object of the present invention is to securely grasp the unlocked state of the cowl member while suppressing cost and time necessary for measures against forgetting of locking of the cowl member.

SUMMARY OF THE INVENTION

An aircraft according to the present invention includes: an engine that includes an engine main body and an engine nacelle, the engine main body outputting thrust force, and the engine nacelle surrounding the engine main body; an engine pylon that supports the engine main body to an airframe, and axially supports a cowl member to be openable, the cowl member configuring the engine nacelle; a locking part that locks the cowl member of the engine nacelle in a closed state; and one or more light emitting sections that are disposed inside the cowl member and show an unlocked state of the cowl member.

In the aircraft according to the present invention, the unlocked state of the cowl member becomes visible by light that is emitted from the one or more light emitting sections and is visible from an outside of the engine nacelle through a gap. The gap is generated on an inner circumference of the cowl member when the cowl member is not locked.

In the aircraft according to the present invention, the one or more light emitting sections may be preferably connected with a power supply through a switch. The switch may be put into an ON state when a load of the airframe is applied to a leg. The one or more light emitting sections may be preferably turned on when the switch is in the ON state, and may be preferably turned off when the switch is in an OFF state.

The aircraft according to the present invention may preferably further include an apparatus that acquires a state of the switch. The switch may be put into the ON state when the load of the airframe is applied to the leg. The apparatus may preferably feed power to the one or more light emitting sections to turn on the one or more light emitting sections when the switch is in the ON state, and may not preferably feed power to the one or more light emitting sections to turn off the one or more light emitting sections when the switch is in the OFF state.

The aircraft according to the present invention may preferably further include a circuit section that applies a pulse-form voltage signal to the one or more light emitting sections. The one or more light emitting sections may preferably each blink in a cycle corresponding to the applied voltage.

In the aircraft according to the present invention, the cowl member may include a first cowl and a second cowl, the first cowl may surround a fan included in the engine main body, and the second cowl may surround an engine core included in the engine main body. The one or more light emitting sections may be disposed inside at least one of the first cowl and the second cowl.

In a case in which the first cowl is not locked when the second cowl is not locked, the one or more light emitting sections are disposed inside at least the first cowl out of the first and second cowls in order to secure locking of the entire cowl member.

In contrast, in a case in which the second cowl is not locked when the first cowl is not locked, the one or more light emitting sections are disposed inside at least the second cowl out of the first and second cowls.

The aircraft according to the present invention may preferably further include a push mechanism that is disposed near a lower end of the engine nacelle. The push mechanism may push the cowl member located on an airframe side of the engine nacelle and the cowl member located on an outer side of the engine nacelle to expand a space therebetween.

In the aircraft according to the present invention, the locking part may preferably include a handle that is operated to lock the cowl member, and the one or more light emitting sections may be preferably disposed on a rear side of the handle in addition to inside the cowl member. The rear side of the handle may be exposed when the cowl member is not locked.

In the aircraft according to the present invention, the one or more light emitting sections may be preferably disposed in a vicinity of a leading edge of the cowl member or in a vicinity of a trailing edge of the cowl member or both.

In the aircraft according to the present invention, the one or more light emitting sections may be preferably disposed over a predetermined range in a circumferential direction including a position of a diameter of the engine nacelle in a horizontal direction or a vicinity of the position.

An aircraft engine according to the present invention is attached to an aircraft. The engine includes: an engine main body that outputs thrust force; and an engine nacelle that surrounds the engine main body. The engine nacelle includes a cowl member, a locking member, and a light emitting section. The cowl member is axially supported to be openable by an engine pylon of the aircraft and surrounds the engine main body. The locking member locks the cowl member in a closed state. The light emitting section is disposed inside the cowl member and shows an unlocked state of the cowl member.

An aircraft engine nacelle according to the present invention includes: a cowl member that is axially supported to be openable by an engine pylon of an aircraft and surrounds an engine main body; a locking member that locks the cowl member in a closed state; and a light emitting section that is disposed inside the cowl member and emits light to outside through a gap. The gap is generated on an inner circumference of the cowl member when the locking member is not locked.

The gap is generated at a predetermined position of the engine nacelle in a state in which the cowl member is not locked, and the gap is not generated at that position in a state in which the cowl member is locked. Therefore, the unlocked state of the cowl member is securely shown by the light that is visible from the outside through the gap as long as the light emitting sections emit light. In addition, the locked state of the cowl member is securely shown by the fact that the light is not visible from the outside.

In the present invention, a mechanical state of the engine nacelle that relates to presence or absence of the gap functions as a mechanical switch that switches whether or not the light emitted from the light emitting sections is outputted to the outside of the engine nacelle. Accordingly, unlike a case in which a sensor that electrically detects whether or not the cowl member is locked is used, possibility of failure is small and the state of locking is visually confirmed, which results in high reliability.

The light emitted from the light emitting sections is recognizable without conscious awareness at any time of day or night.

Therefore, it is unnecessary for the present invention to design and develop a controller and wirings to the cockpit, and the present invention allows a maintenance crew around the airframe, who is working outside, to notice blinking light, thereby prompting the maintenance crew to lock the cowl member, unlike the case in which the electric sensor detects whether or not the cowl member is locked and the state of locking is displayed on the device in the cockpit. It is possible for the maintenance crew to grasp the unlocked state at a position widely separated from the airframe as long as the light emitted from the light emitting sections reaches the position.

As mentioned above, the present invention makes it possible to securely grasp the unlocked state of the cowl member while suppressing cost and time necessary for measures against forgetting of locking of the cowl member.

DETAILED DESCRIPTION OF THE PREFERRED EMBODIMENTS

An embodiment of the present invention is described below with reference to accompanying drawings.

Figure 1:
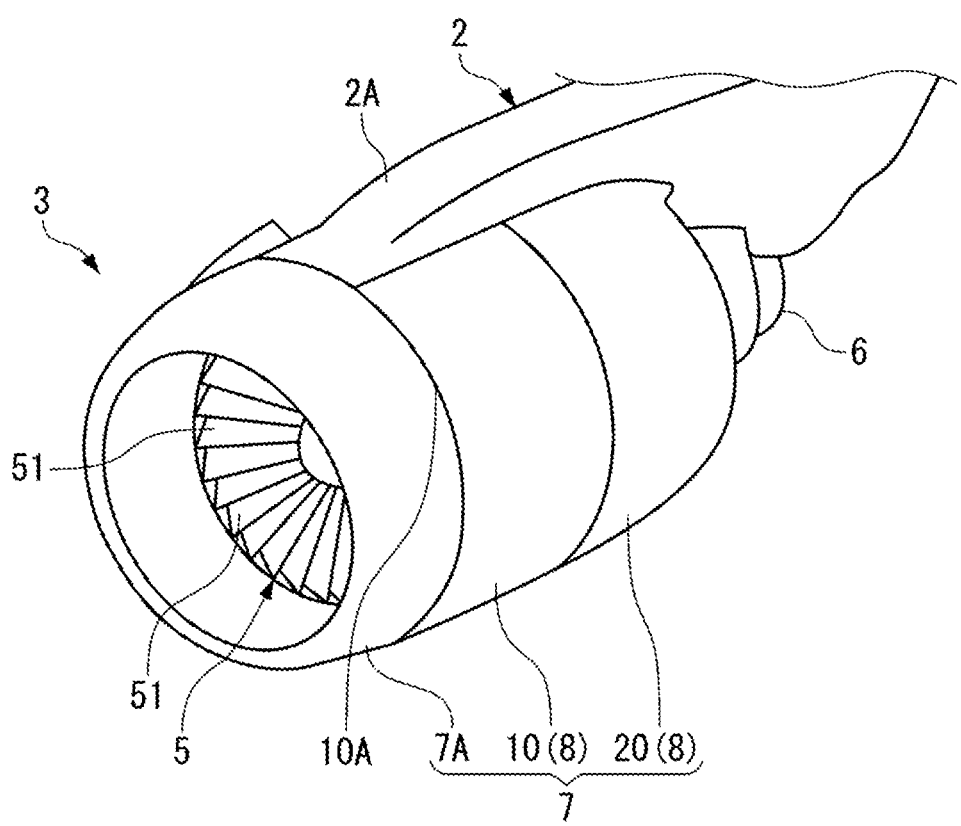
FIG. 1 is a perspective view illustrating an engine of an aircraft according to an embodiment of the present invention.
Figure 2:
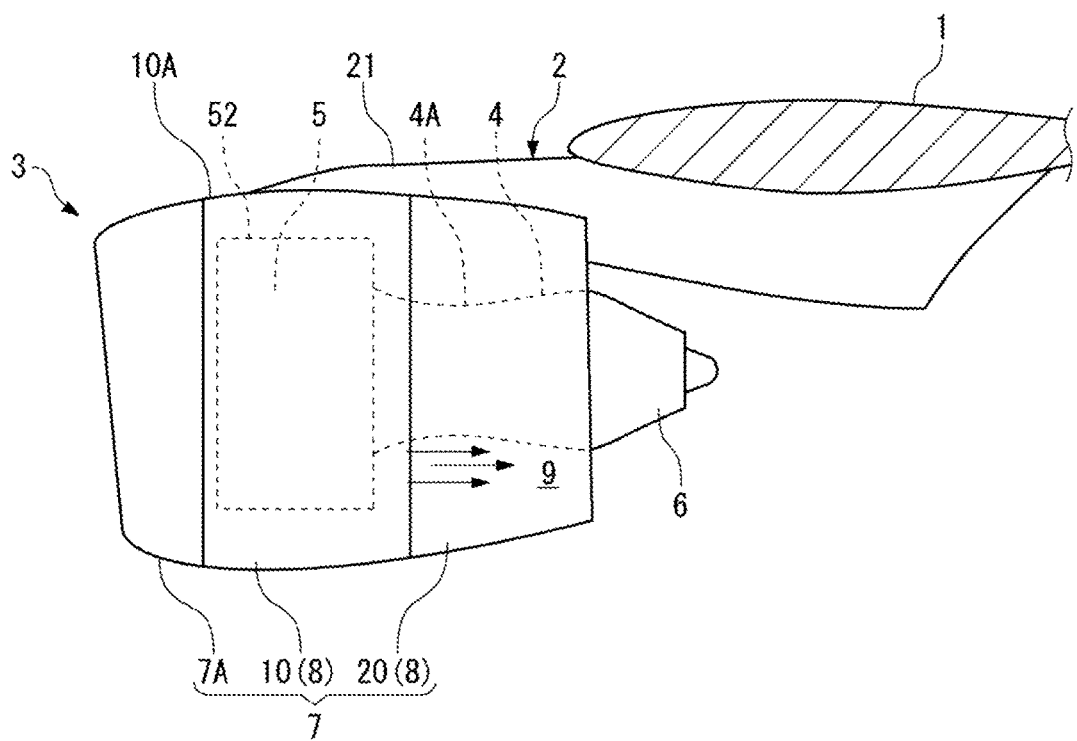
FIG. 2 is a side view of the engine illustrated in FIG. 1.

As illustrated in FIG. 1 and FIG. 2, an engine pylon 2 is attached on the bottom side of a main wing 1 (FIG. 2) of an aircraft, and an engine 3 is supported to the main wing 1 by the engine pylon 2.

In the drawings including FIG. 1 and FIG. 2, the engine 3 that is supported to the main wing 1 on left side (a left wing) is illustrated.

The engine pylon 2 includes a pylon main body (not illustrated) and a fairing 2A. The pylon main body is a structural member, and the fairing 2A is an aerodynamic fairing provided in the pylon main body.

As illustrated in FIG. 2, the engine 3 is a turbo fan engine that includes a fan 5 on the front side of an engine core 4 to be supplied with fuel.

In the present specification, side provided with the fan 5 in the engine 3 is defined as "front", and side opposite thereto is defined as "rear".

The engine 3 includes an engine main body, an engine nacelle 7, and an exhaust nozzle 6. The engine main body includes the engine core 4 (FIG. 2) and the fan 5. The engine nacelle 7 configures an outer hull of the engine 3.

Although illustration of components are omitted, the engine core 4 (FIG. 2) includes a low-pressure compressor, a high-pressure compressor, a combustion chamber, a high-pressure turbine, and a low-pressure turbine. The components are housed in an engine case 4A. Jet flow generated by the engine core 4 is ejected from the exhaust nozzle 6.

Although not illustrated, the engine 3 is provided with various accessories such as a fuel control device, a fuel pump, an ignition device, and a plurality of heat exchangers, and various gauges such as a temperature sensor.

These accessories, pipes associated with the accessories, and the various gauges are disposed around the engine core 4 and the fan 5 inside the engine nacelle 7.

The fan 5 rotates in response to transmission of rotating force of the high-pressure turbine or the low-pressure turbine of the engine core 4.

The fan 5 includes a fan main body and a fan case 52 (FIG. 2). The fan main body includes a plurality of blades 51 (FIG. 1).

As illustrated in FIG. 1 and FIG. 2, the engine nacelle 7 includes an air inlet 7A and a cowl member 8. The air inlet 7A is located at a front end, and the cowl member 8 is continuous with the air inlet 7A.

The engine nacelle 7 includes, as the cowl member 8, a fan cowl 10 and a thrust reverser cowl 20.

The fan cowl 10 and the thrust reverser cowl 20 may be each formed of a fiber reinforced resin material containing reinforced fiber such as carbon fiber, or a metal material such as an aluminum alloy.

As illustrated in FIG. 2, the fan cowl 10 surrounds the fan 5.

The thrust reverser cowl 20 surrounds a core cowl (not illustrated) that surrounds the engine case 4A on the rear side of the fan 5. The thrust reverser cowl 20 is continuous with the rear side of the fan cowl 10 in a normal state as illustrated in FIG. 2, and is slid rearward to generate reverse thrust in landing.

The air taken from the air inlet 7A into the engine nacelle 7 is discharged rearward from the fan 5, and is then divided into airflow that is supplied into the engine core 4 inside the engine case 4A and airflow (fan flow) that passes through a bypass flow path 9 between the core cowl and the thrust reverser cowl 20 that surround the engine case 4A.

Thereafter, the fan flow that flows rearward from the bypass flow path 9 (FIG. 2) and the jet flow discharged from the exhaust nozzle 6 are joined, and the joined airflow is exhausted to the rear side of the engine 3.

Each of the fan cowl 10 and the thrust reverser cowl 20 is divided, along an axis line, at an upper end attached to the engine pylon 2 and a lower end. A dihedral angle (see FIG. 6) provided to the main wing 1 causes a position of a boundary between the airframe side (fuselage side) and the outer side (wing tip side) of each of the fan cowl 10 and the thrust reverser cowl 20 to shift from a vertical line V (FIG. 6) that is perpendicular to the ground. The boundary on the lower end side is positioned on the outer side of the vertical line V.

Figure 3:
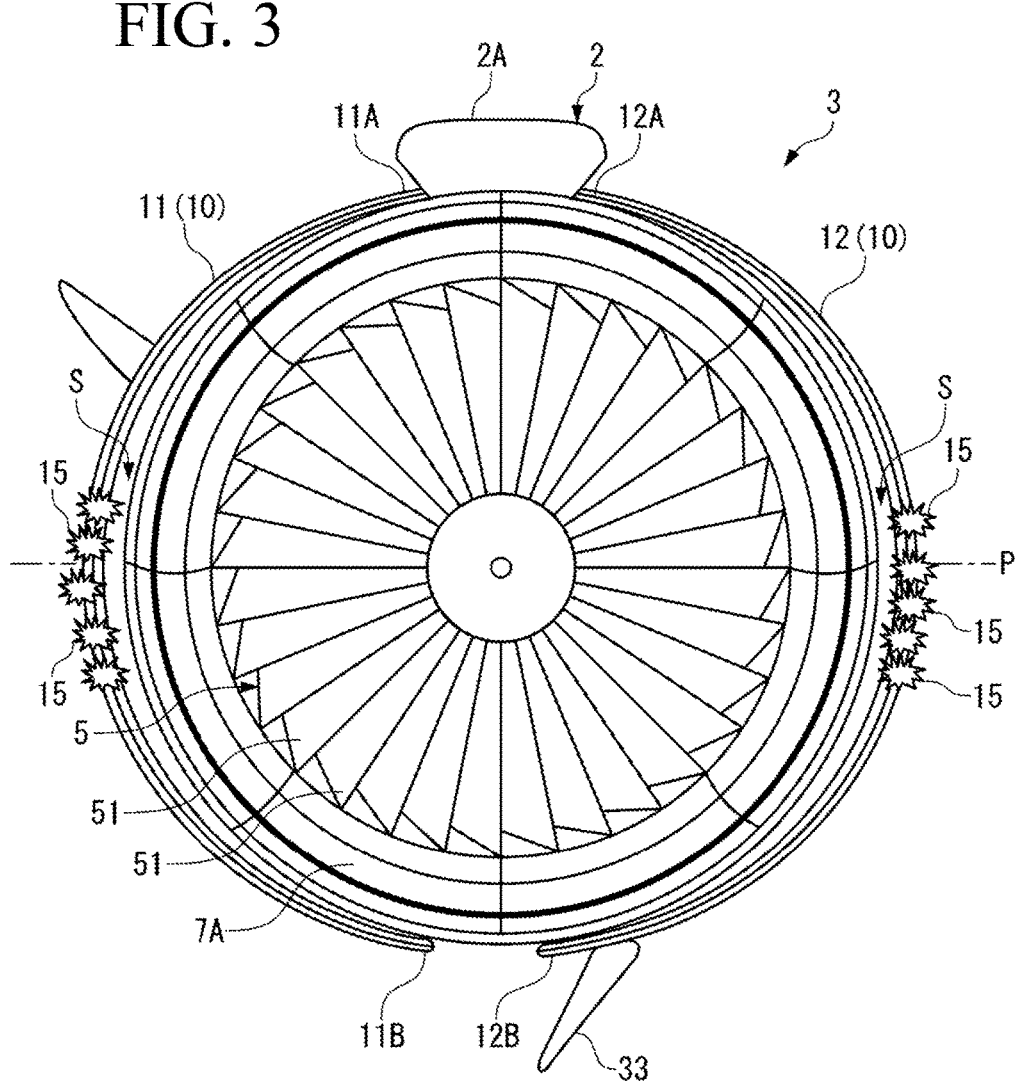
FIG. 3 is a front view of the engine illustrated in FIG. 1.

As illustrated in FIG. 3, the fan cowl 10 is configured of an airframe side cowl member 11 and an outer side cowl member 12. The thrust reverser cowl 20 is also configured of an airframe side cowl member and an outer side cowl member, as with the fan cowl 10.

Light emitting sections 15 and wiring thereof, and a push mechanism 18 are installed inside the fan cowl 10 as described later.

In the present embodiment, out of the fan cowl 10 and the thrust reverser cowl 20 that configure the engine nacelle 7, the fan cowl 10 is exemplified, and a configuration that addresses forgetting of locking operation of the airframe side cowl member 11 and the outer side cowl member 12 is described.

As illustrated in FIG. 3, an upper end 11A of the airframe side cowl member 11 and an upper end 12A of the outer side cowl member 12 face each other with the engine pylon 2 in between, and are attached to the structural member of the engine pylon 2.

Further, a lower end 11B of the airframe side cowl member 11 and a lower end 12B of the outer side cowl member 12 face each other.

Figure 4:
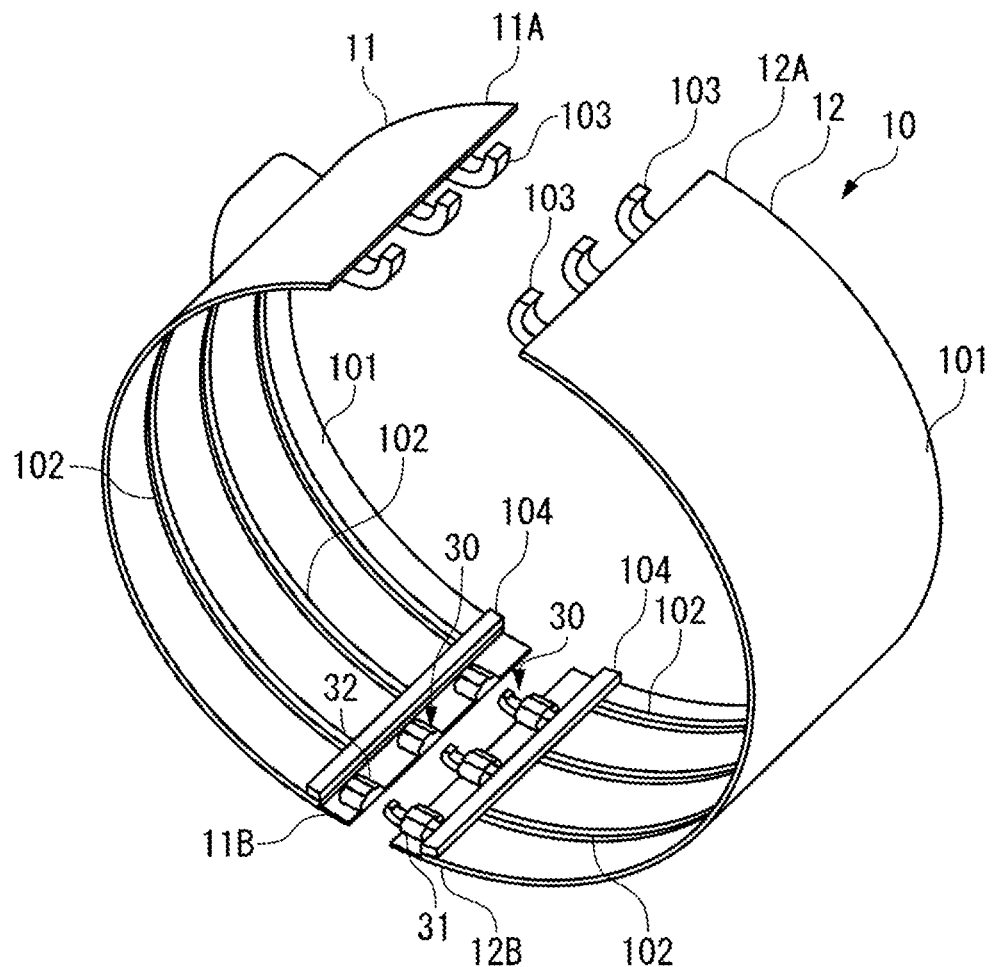
FIG. 4 is a perspective view illustrating a fan cowl that is a cowl member of an engine nacelle.

FIG. 4 is a diagram illustrating a configuration of the airframe side cowl member 11 and the outer side cowl member 12 of the fan cowl 10.

Each of the airframe side cowl member 11 and the outer side cowl member 12 includes a panel 101, frame stiffeners 102, hinges 103, and components configuring latch devices 30. The panel 101 is curved in an arc shape, and the frame stiffeners 102 are provided on the rear side of the panel 101 along a circumferential direction.

The panel 101 is reinforced by the plurality of frame stiffeners 102 and longerons 104 that are provided on an upper end and a lower end of the panel 101 along an axis line direction.

Figure 5:
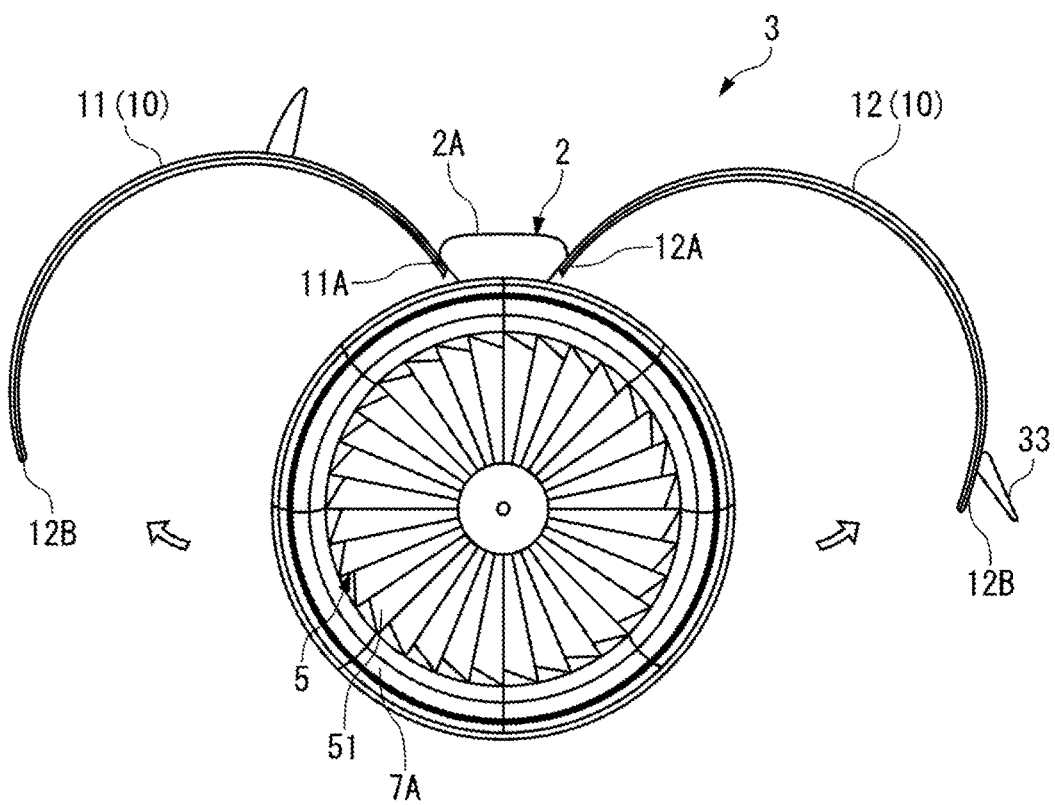
FIG. 5 is a front view illustrating the engine in which the fan cowl is opened.

The plurality of hinges 103 are provided at intervals in the axis line direction on each of the upper end 11A of the airframe side cowl member 11 and the upper end 12A of the outer side cowl member 12. The hinges 103 are axially supported to be openable, by the structural member of the engine pylon 2. In other words, pivoting each of the airframe side cowl member 11 and the outer side cowl member 12 through the hinges 103 makes it possible to open the fan cowl 10 to both sides as illustrated in FIG. 5 and to close the fan cowl 10 as illustrated in FIG. 1.

The fan cowl 10 is opened for inspection and maintenance of the accessories and the gauges that are covered with the fan cowl 10. A supporting rod (not illustrated) is provided on each of the airframe side cowl member 11 and the outer side cowl member 12. The supporting rod supports the airframe side cowl member 11 and the outer side cowl member 12 to the fan case 52 in the open state.

The latch devices 30 couple the lower end 11B of the airframe side cowl member 11 with the lower end 12B of the outer side cowl member 12. The fan cowl 10 is locked in the closed state by the latch devices 30. When the fan cowl 10 is not locked by the latch devices 30, the airframe side cowl member 11 is slightly opened by own weight due to the dihedral angle of the main wing 1.

The plurality of latch devices 30 are provided at intervals in the axis line direction on the respective lower ends of the airframe side cowl member 11 and the outer side cowl member 12.

Each of the latch devices 30 includes a latch 31, a locking part 32, and a latch handle 33 (FIG. 3). The locking part 32 locks the latch 31, and the latch handle 33 is assembled to the latch 31.

In the present embodiment, the latch 31 and the latch handle 33 are provided on the lower end 12B of the outer side cowl member 12, and the locking part 32 is provided on the lower end 11B of the airframe side cowl member 11; however, these members may be provided in a reversed manner.

Figure 6:
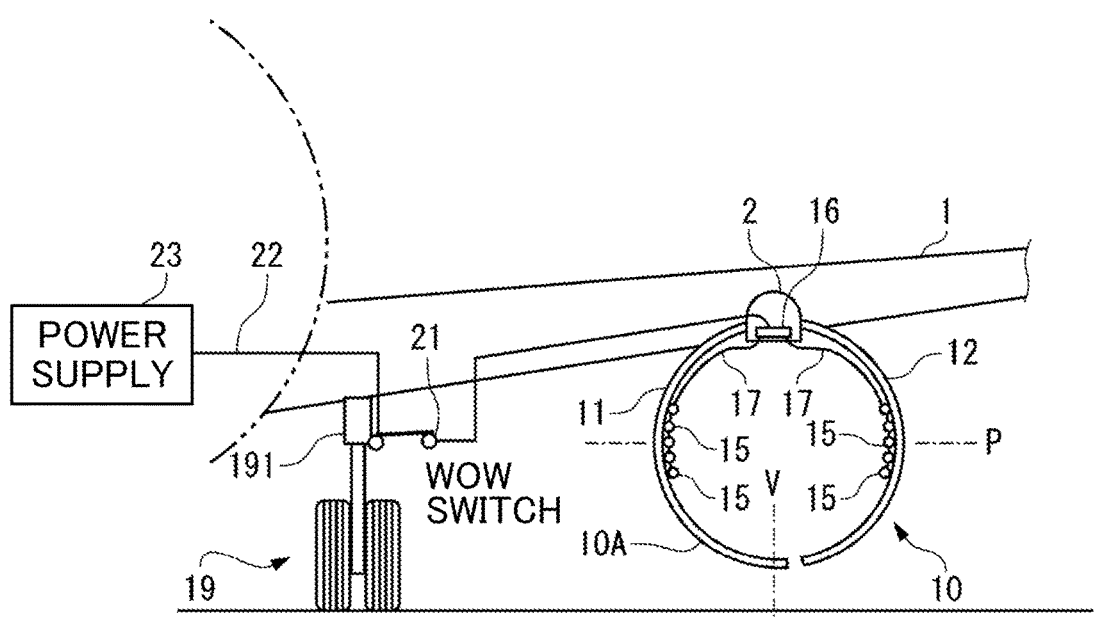
FIG. 6 is a schematic diagram illustrating light emitting sections that are installed in the fan cowl, a WOW switch, and a power supply.

As illustrated in FIG. 6, the light emitting sections 15 and electric wires 17 are provided on an inner circumferential part of the fan cowl 10. Each of the light emitting sections 15 includes a light source.

Each of the light emitting sections 15 is supplied with power through the electric wire 17, thereby emitting light. The light emitting sections 15 show an unlocked state of the fan cowl 10 when the fan cowl 10 is not locked in the closed state. The light emitting sections 15 emit light with a wavelength that is easily visible at any time of day and night, such as red light, in order to securely show the unlocked state of the fan cowl 10.

In the present embodiment, a light emitting diode (LED) is used as a light source of each of the light emitting sections 15 in terms of power consumption, lifetime, and reliability. An optical component such as a lens may be added to each of the light emitting sections 15. In addition, for example, an optional light source such as an organic electroluminescence (EL) may be used for each of the light emitting sections 15.

As a switch that switches a state of the light emitting sections 15 between a power-supplied state and a power-unsupplied state, the WOW switch 21 that is provided on a leg 19 (a landing gear) is used. The leg 19 supports the airframe of the aircraft. In addition, an electric wire 22 that is routed from a power supply 23 to the WOW switch 21 is also used to supply power to the light emitting sections 15.

The WOW switch 21 detects that the aircraft locates on the ground, based on contraction of the shock strut 191 of the leg 19 caused by application of a load of the airframe (weight on wheel (WOW)). The WOW switch 21 allows for determination whether the aircraft is in flight or on the ground. A proximity switch that electrically detects a state in which parts of the shock strut 191 are relatively close to each other, may be used as the WOW switch 21. The WOW switch 21 is supplied with power through the electric wire 22 from the power supply 23 (a battery) that is disposed in an electronic device chamber of the airframe.

Data detected with use of the WOW switch 21 is used for various control of the aircraft. In the configuration illustrated in FIG. 6, the light emitting sections 15 are connected with the power supply 23 though the WOW switch 21. This causes power to be fed to the light emitting sections 15 through the WOW switch 21 from the power supply 23, and the light emitting sections 15 are each turned on or off in direct conjunction with the state of the WOW switch 21.

A configuration in which a signal of the WOW switch 21 is taken in a controller, a relay circuit, or the like to indirectly feed power to the light emitting sections 15 is allowable.

When the parts of the shock strut 191 are close to each other because of contraction of the shock strut 191, the WOW switch 21 is put into an ON state as illustrated in FIG. 6, and the power is supplied from the power supply 23 to the light emitting sections 15 through the electric wire 22 and the electric wires 17. In other words, the power is fed to the light emitting sections 15 and the light emitting sections 15 accordingly emit light constantly while the aircraft locates on the ground and the WOW switch 21 is in the ON state.

On the other hand, the power is not fed to the light emitting sections 15 and the light emitting section 15 accordingly does not emit light while the aircraft is away from the ground and the parts of the shock strut 191 are separated from each other to put the WOW switch 21 into an OFF state.

In the present embodiment, the plurality of light emitting sections 15 are connected in series to one another through the electric wires 17, and the plurality of light emitting sections 15 are disposed at intervals in the circumferential direction of the fan cowl 10 near a leading edge 10A of the fan cowl 10. Since the frame stiffeners 102 are provided on the inner circumferential part of the fan cowl 10, the electric wires 17 are easily wired along the frame stiffeners 102. The electric wires 17 may be fixed to the frame stiffeners 102 by brackets.

The plurality of light emitting sections 15 are disposed within a predetermined range in the circumferential direction including a position P of a diameter of the fan cowl 10 in a horizontal direction.

A line-shaped light emitting section in which a plurality of point light sources such as LEDs are arranged may be disposed within a similar range, in place of the light emitting sections 15.

Note that the light emitting sections 15 and the electric wires 17 may be provided on an outer circumferential part of the fan case 52.

In the present embodiment, a circuit section 16 that is connected with the WOW switch 21 and drives the light emitting sections 15 applies a voltage signal to the plurality of light emitting sections 15. Although detailed illustration is omitted, the circuit section 16 includes a circuit substrate, electronic components, and a case. The circuit substrate is provided with an integrated circuit (IC) and a semiconductor switching device. Examples of the electronic components may include a capacitor. The case houses the circuit substrate and the electronic components. The circuit section 16 may be provided on the inner circumferential part of the fan cowl 10 as with the light emitting sections 15, or may be provided inside the engine pylon 2 as illustrated in FIG. 6.

While the WOW switch 21 is in ON state, a pulse-form voltage signal is generated from the power supply voltage through switching in the circuit section 16, and the generated pulse-form voltage signal is applied to the light emitting sections 15, which intermittently turns on the light emitting sections 15. Then, each of the light emitting sections 15 blinks in a cycle corresponding to the applied pulse. "Turning on" used in the present specification includes repetition of blinking on and off.

Figure 7A:
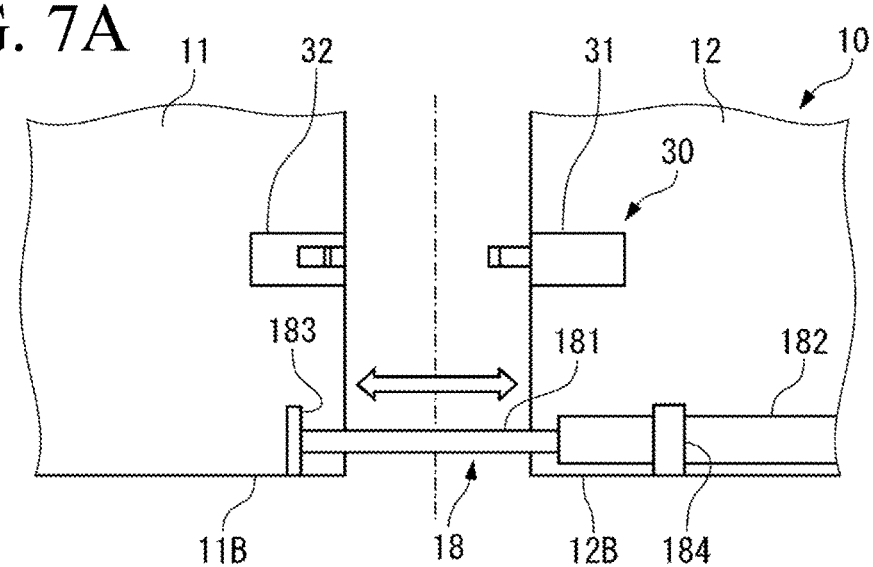
FIGS. 7A and 7B are schematic diagrams each to explain a push mechanism provided in the fan cowl.

FIG. 7A is a diagram schematically illustrating the push mechanism 18 that is provided on the inner circumferential part of the fan cowl 10.

The push mechanism 18 pushes the airframe side cowl member 11 and the outer side cowl member 12 near the lower end of the fan cowl 10 to expand a space therebetween, thereby separating the airframe side cowl member 11 and the outer side cowl member 12 from each other when the fan cowl 10 is not locked in the closed state. This causes the airframe side cowl member 11 and the outer side cowl member 12 to project outward from a front surface of the air inlet 7A as illustrated in FIG. 3. As a result, a gap S is secured between the airframe side cowl member 11 and the air inlet 7A and between the outer side cowl member 12 and the air inlet 7A, as viewed from front side as illustrated in FIG. 3.

As mentioned above, the light emitting sections 15 are fed with power while the aircraft locates on the ground. Therefore, blinking of the light emitting sections 15 is visible from the outside of the fan cowl 10 through the gap S. The gap S having an appropriate width may be preferably secured by the push mechanism 18 to allow the light to be easily viewed from the outside of the fan cowl 10.

The push mechanism 18 is disposed near the leading edge of the fan cowl 10 such that the cowl members 11 and 12 are separated from each other on the leading edge side of the fan cowl 10 at which the light emitting sections 15 are located, to form the gap S at least from the light emitting sections 15 to the leading edge of the fan cowl 10.

In the airframe side cowl member 11 that is slightly opened by the dihedral angle, providing the push mechanism 18 makes it possible to stably secure the gap S irrespective of a friction state at the boundary between the airframe side cowl member 11 and the air inlet 7A located on the front side of the airframe side cowl member 11 and the boundary between the airframe side cowl member 11 and the thrust reverser cowl 20 located on the rear side of the airframe side cowl member 11.

As illustrated in FIG. 7A, the push mechanism 18 includes a push rod 181, a pod 182, and a receiving part 183. The pod 182 includes therein an unillustrated spring that applies pressure to the push rod 181. The receiving part 183 receives pressing force by the push rod 181.

The pod 182 is fixed near the leading edge of the lower end 12B of the outer side cowl member 12 by a bracket 184. The push rod 181 is assembled to the pod 182.

The receiving part 183 is a wall on which a front end of the push rod 181 is abutted. The receiving part 183 may be a part of the longeron 104 that is located near the leading edge of the lower end 11B of the airframe side cowl member 11.

The push rod 181 is so disposed substantially horizontally as to extend over the lower end 11B of the airframe side cowl member 11 and the lower end 12B of the outer side cowl member 12. When the cowl members 11 and 12 are pushed by the push mechanism 18 to expand the space therebetween, the cowl members 11 and 12 swell in an expanding direction as illustrated in FIG. 3. The gap on the inner circumference of each of the cowl members 11 and 12 becomes the highest at or near the position P of the diameter of the fan cowl 10 in the horizontal direction. The gap S on the inner circumference of each of the cowl members 11 and 12 is formed in a substantially crescent shape.

Figure 7B:
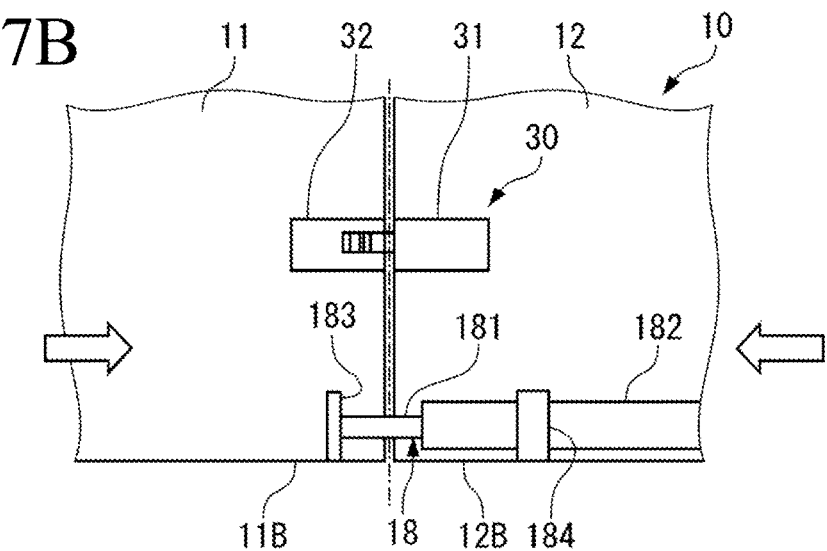

When the latch handle 33 (FIG. 3) is laid down toward the front surface of the cowl member 12 while the cowl members 11 and 12 that are separated to both sides by the push mechanism 18 are closed against elastic force of the spring inside the pod 182 as illustrated in FIG. 7B, the latch 31 that is in conjunction with the latch handle 33 is locked by the locking part 32. When the fan cowl 10 is locked in the closed state in such a manner, the gap S disappears, and the front surface of the fan cowl 10 and the front surface of the air inlet 7A become continuous with each other as illustrated in FIG. 1. Although the light emitting sections 15 emit light inside the fan cowl 10 while the airframe locates on the ground even when the fan cowl 10 is locked, the light is not visible from the outside of the fan cowl 10 because the gap S is not generated.

A series of working procedures until the fan cowl 10 is closed and locked after the fan cowl 10 is opened and maintenance is performed, is described below.

First, the lock of the fan cowl 10 is released by raising the latch handle 33 as illustrated in FIG. 3. At this time, the latch 31 is unlocked from the locking part 32 in conjunction with the latch handle 33. Thereafter, the push rod 181 of the push mechanism 18 (FIG. 7A) is extended from the pod 182 by the elastic force of the spring, which pushes the airframe side cowl member 11 and the outer side cowl member 12 to expand the space therebetween.

When the lock of the fan cowl 10 is released, the airframe side cowl member 11 and the outer side cowl member 12 are respectively opened to both sides as illustrated in FIG. 5. Thereafter, the accessories and the gauges are inspected and maintained while the opened cowl members 11 and 12 are supported to the fan case 52 by the supporting rods.

At this time, when a circuit breaker that is provided on the airframe to supervise an electrical system is turned on, the power is fed from the power supply 23 to the WOW switch 21, and the WOW switch 21 is in the ON state because the airframe is parked on the ground. Accordingly, power is fed to the light emitting sections 15 (see FIG. 6). Therefore, the light emitting sections 15 blink on the rear side of the opened cowl members 11 and 12.

After the inspection and the maintenance are completed, the supporting rods are detached from the fan case 52, and the airframe side cowl member 11 and the outer side cowl member 12 are caused to pivot downward. Thereafter, the latch handle 33 is laid down while the cowl members 11 and 12 are held from the both sides, which causes the latch device 30 to lock the airframe side cowl member 11 and the outer side cowl member 12.

Incidentally, although the fan cowl 10 may be forgotten to be locked, an unlocked state of the fan cowl 10 according to the present embodiment is clearly shown by the light emitted from the light emitting sections 15.

More specifically, when the fan cowl 10 is not locked, the light emitted from the light emitting sections 15 is visible from the outside through the gap S, as illustrated in FIG. 3. The unlocked state of the fan cowl 10 becomes visible by the light passing through the gap S.

Therefore, even if the locking of the fan cowl 10 is forgotten, a maintenance crew around the airframe can immediately notice the unlocked state of the fan cowl 10 and can lock the fan cowl 10. The unlocked state is grasped even at a position widely separated from the airframe as long as the light emitted from the light emitting sections 15 reaches the position.

When the fan cowl 10 is locked, the airframe side cowl member 11 and the outer side cowl member 12 are completely closed to eliminate the gap S. Therefore, the locked state of the fan cowl 10 is grasped based on the fact that the light emitted from the light emitting sections 15 is not leaked to the outside.

After the aircraft takes off, the WOW switch 21 is put into the OFF state, and the power is not fed to the circuit section 16 and the light emitting sections 15. Therefore, the light emitting sections 15 are turned off, and the circuit section 16 does not operate. Since the light emitting sections 15 and the circuit section 16 do not consume power during flight, the technology is adopted in an emergency in which the engine 3 is stopped and it is necessary to eliminate slight power consumption.

When the aircraft lands on the ground after the flight and the WOW switch 21 is put into the ON state, the light emitting sections 15 are turned on again. Even if the fan cowl 10 is opened and the locking of the fan cowl 10 is forgotten in this state, the unlocked state is visible by the light passing through the gap S, which prompts the maintenance crew to lock the fan cowl 10. Thereafter, the light emitting sections 15 are turned off when the circuit breaker is shut off.

In the present embodiment, the light emitted from the light emitting sections 15 that are installed in the fan cowl 10 is outputted to the outside through the gap S that is generated in the inner circumference of the fan cowl 10 because the fan cowl 10 is not completely closed. The unlocked state of the fan cowl 10 becomes visible by the light passing through the gap S, which makes it possible for the unlocked state of the fan cowl 10 to be visually grasped easily and be securely recognized without conscious attention of the maintenance crew.

The light emitted from the light emitting sections 15 is recognizable without conscious awareness at any time of day or night.

Further, unlike paint, a member, and the like that reflect light, the light emitting sections 15 do not require outside light from a light for maintenance or the like, and the light emitting sections 15 in themselves actively emit light.

In addition to the above description, the light emitting sections 15 have high visibility because of attracting attention through blinking. The cycle of the blinking may be appropriately defined in consideration of visual easiness.

Further, in the present embodiment, the light is emitted by the plurality of light emitting sections 15 that are arranged in the gap S secured by the push mechanism 18, from a region over the predetermined range in the circumferential direction on each of the airframe side and the outer side of the fan cowl 10. The region is located at a center part of the fan cowl 10 in a height direction, and is easily viewed by the maintenance crew standing around the engine 3. This allows the maintenance crew to easily recognize the light emitted from the light emitting sections 15.

Moreover, since the light emitting sections 15 that show the unlocked state of the fan cowl 10 are integrally installed in the fan cowl 10, it is unnecessary to provide an appendage such as a flag that is attached and detached to/from the fan cowl 10 at every maintenance to show the unlocked state of the fan cowl 10. This eliminates additional work other than minimum procedures of releasing the lock of the fan cowl 10, opening the cowl members 11 and 12 to perform maintenance, then closing the cowl members 11 and 12, and locking the fan cowl 10 in the maintenance of the inside of the fan cowl 10.

The present embodiment makes it possible to show the unlocked state of the fan cowl 10 by installing, in the fan cowl 10, the light emitting sections 15 to be fed with power.

It is assumed that it is determined whether or not the fan cowl 10 is locked, based on a value detected by a sensor in order to display a warning message showing the unlocked state on the device in a cockpit, and the determination result is transmitted to the device in the cockpit through a data bus of avionics of the aircraft when the fan cowl 10 is unlocked. In this case, it is necessary to design and develop software that includes a logic appropriately determining whether or not the fan cowl 10 is locked, a sensor, a controller, wirings, and the like in consideration of redundancy and lighting protection. It may be necessary to add the data bus of avionics. Much cost and time are consumed for such design and development.

In the present embodiment, the light emitting sections 15 that are necessary to show the unlocked state of the fan cowl 10, constantly emit light while the aircraft is parked on the ground and correction of failure of the locking is performable. Further, the unlocked state of the fan cowl 10 is securely shown by the light visible from the outside through the gap S, and the locked state of the fan cowl 10 is securely shown based on the fact that the light is not visible from the outside while the aircraft is parked on the ground.

The light emitting sections 15 are turned on or off without introducing errors, in conjunction with the WOW switch 21, reliability of which is confirmed. In addition, the circuit section 16 that applies the voltage to the light emitting sections 15 may be freely selectable from general-purpose small products that have sufficient reliability and light weight.

Accordingly, the present embodiment makes it possible to securely show the state of locking of the fan cowl 10 while largely suppressing cost and time necessary for measures against locking failure, as compared with the case in which the warning message is displayed on the device in the cockpit as mentioned above.

It is possible to install the light emitting sections 15 and the circuit section 16 in the fan cowl 10 without influence on an existing system provided in the aircraft, the other configurations in the engine 3, and the working procedure of opening and maintaining the fan cowl 10. This makes it easy to provide a function of showing the unlocked state by the light emitting sections 15, to the fan cowl 10 of the engine 3 in the existing airframe.

The light emitting sections 15 may be installed in the vicinity of a trailing edge of the inner circumferential part of the fan cowl 10. In this case, the push mechanism 18 may be preferably provided in the vicinity of the trailing edge, thereby causing the light emitting sections 15 to emit light to the rear side of the fan cowl 10. The light emitting sections 15 may be installed in both of the vicinity of the leading edge and the vicinity of the trailing edge.

The light emitting sections 15 may be provided at the center part of the fan cowl 10 in the axis line direction as long as the light emitted from the light emitting sections 15 is visible from the outside of the fan cowl 10 through the gap S.

In the above description, the light emitting sections 15 are installed in the vicinity of the leading edge or the trailing edge of the fan cowl 10; however, the light emitting sections 15 may be installed in the vicinity of the leading edge or the trailing edge of the thrust reverser cowl 20. In this case, the unlocked state of the thrust reverser cowl 20 is visible by the light that is outputted to the outside through a gap formed on the inner circumference of the thrust reverser cowl 20, even if locking of the thrust reverser cowl 20 is forgotten after maintenance. This allows the maintenance crew to notice and address the unlocked state of the thrust reverser cowl 20 on site. To further improve visibility of the light emitted from the light emitting sections 15, the push mechanism 18 may be preferably provided in the vicinity of the leading edge or the trailing edge of the thrust reverser cowl 20 in which the light emitting sections 15 are installed.

Next, a modification of the present invention is described with reference to FIG. 8.

Figure 8:
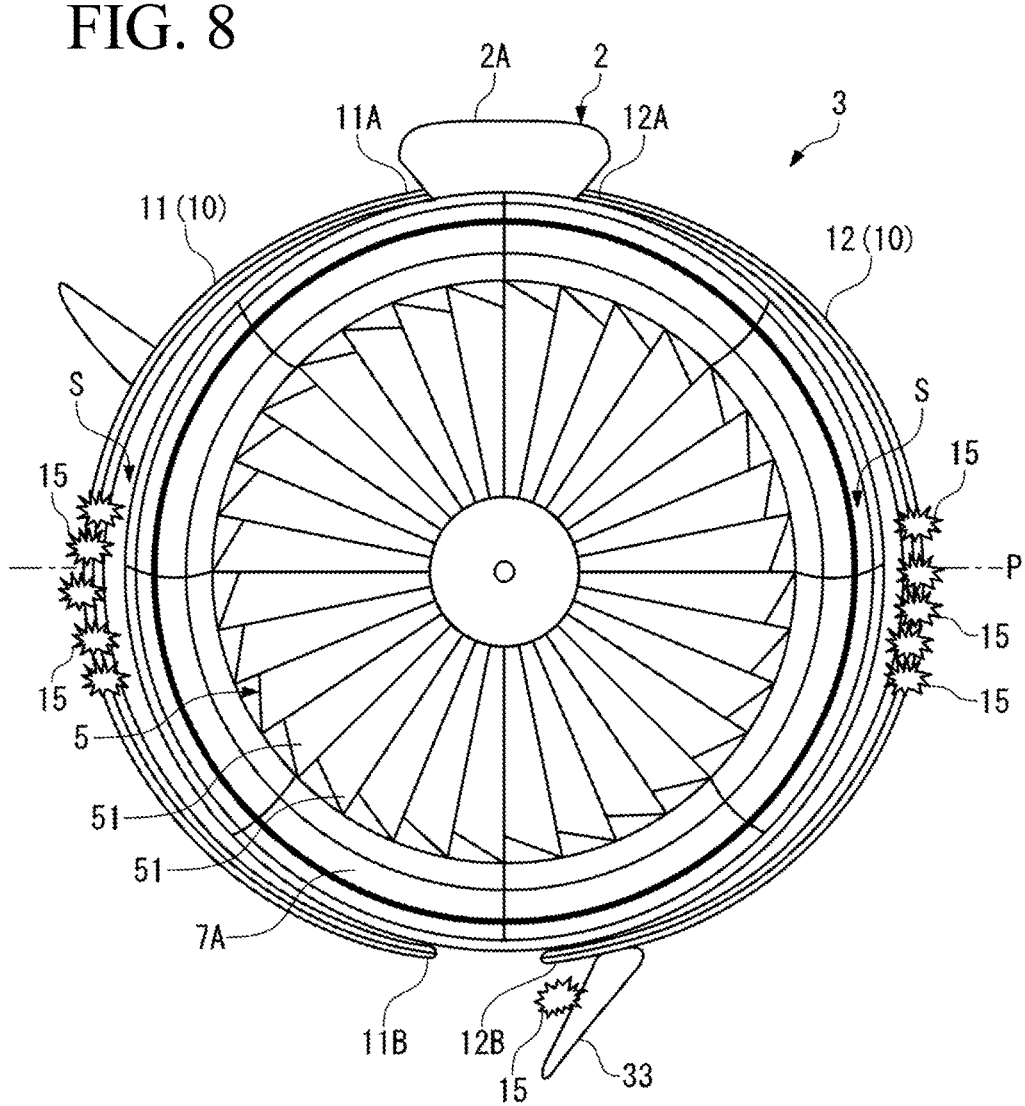
FIG. 8 is a diagram illustrating a modification of the present invention in which a light emitting section is provided in a latch handle.

In an example illustrated in FIG. 8, the light emitting section 15 is also installed on the rear side of the latch handle 33. The electric wire 17 (FIG. 6) that is wired in the inner circumferential part of the outer side cowl member 12 is routed to the light emitting section 15 on the rear side of the latch handle 33.

When the fan cowl 10 is not locked, the latch handle 33 is projected from the front surface of the fan cowl 10 as illustrated in FIG. 8, and the rear side of the latch handle 33 is exposed. Therefore, it is possible to grasp the unlocked state of the fan cowl 10 based on the appearance of the projected latch handle 33 and the light emitted from the light emitting section 15 on the rear side of the latch handle 33. When the latch handle 33 is laid down to lock the fan cowl 10, the light emitted from the light emitting section 15 is not visible from the outside, which causes the locked state of the fan cowl 10 to be grasped.

Figure 9:
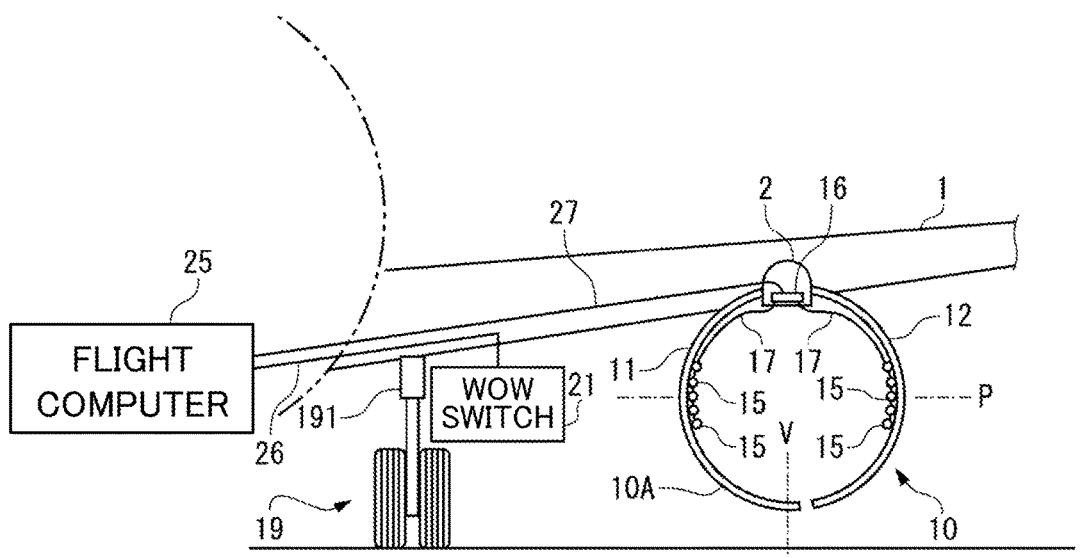
FIG. 9 is a diagram illustrating a modification of the present invention in which light emitting sections are turned on or off based on a state of a WOW switch.

Further, FIG. 9 is a diagram illustrating a modification of the present invention in which the light emitting sections 15 are turned on or off in response to the state of the WOW switch 21.

An apparatus 25 such as a flight computer provided in the aircraft acquires the state of the WOW switch 21 through the electric wire 26. The apparatus 25 is connected with the circuit section 16 that drives the light emitting sections 15, through an electric wire 27.

The apparatus 25 feeds power to the light emitting sections 15 to turn on the light emitting sections 15 when the WOW switch 21 is in the ON state, and does not feed power to the light emitting sections 15 to turn off the light emitting sections 15 when the WOW switch 21 is in the OFF state.

Even in the configuration as illustrated in FIG. 9, the light emitting sections 15 are turned on or off in response to the state of the WOW switch 21, as with the above-described embodiment. Therefore, the maintenance crew can notice forgetting of locking by the light that is leaked from the gap S on the inner circumference of the fan cowl 10 while the light emitting sections 15 emit light.

In addition to the above description, the configurations described in the above-described embodiment may be selected or appropriately modified without departing from the scope of the present invention.

In place of the push mechanism 18 that pushes the airframe side cowl member and the outer side cowl member that configure the fan cowl 10 and the thrust reverser cowl 20 to expand the space therebetween, a push mechanism that pushes one of the airframe side cowl member and the outer side cowl member against the engine main body (the fan 5 and the engine core 4), the air inlet 7A of the engine nacelle 7, or the exhaust nozzle 6, may be adopted.

For example, it is assumed that the push rod 181 provided on the outer side cowl member 12 pushes the outer side cowl member 12 of the fan cowl 10 against a receiving part provided in the air inlet 7A that is an integrated unopenable member. Thus, the outer side cowl member 12 is pushed back and opened, and the gap S is secured on the inner circumference of the outer side cowl member 12. Therefore, the light emitted from the light emitting sections 15 is clearly visible through the gap S. In this case, the light emitting sections 15 may be disposed only on the inside of the outer side cowl member 12.

The gap S may be secured on the inner circumference of the cowl member in some cases even if the push mechanism is not provided, depending on the shape and rigidity previously provided to the airframe side cowl member and the outer side cowl member, or depending on the dihedral angle as for the airframe side cowl member. Therefore, the push mechanism is not necessarily essential in the present invention.

What is claimed is:

1. An aircraft, comprising:
    an engine that includes an engine main body and an engine nacelle, the engine main body outputting thrust force, and the engine nacelle surrounding the engine main body;
    an engine pylon that supports the engine main body to an airframe, and axially supports a cowl member to be openable, the cowl member configuring the engine nacelle;
    a locking part that locks the cowl member of the engine nacelle in a closed state; and
    one or more light emitting sections that are disposed inside the cowl member and show an unlocked state of the cowl member,
    wherein the unlocked state of the cowl member becomes visible by light emitted from the one or more light emitting sections and visible from an outside of the engine nacelle through a gap generated on an inner circumference of the cowl member when the cowl member is not locked.

2. The aircraft according to claim 1, further comprising an apparatus that acquires a state of a switch, the switch being put into an ON state when a load of the airframe is applied to a leg, wherein
    the apparatus feeds power to the one or more light emitting sections to turn on the one or more light emitting sections when the switch is in the ON state, and
    the apparatus does not feed power to the one or more light emitting sections to turn off the one or more light emitting sections when the switch is in an OFF state.

3. The aircraft according to claim 1, further comprising a circuit section that applies a pulse-form voltage signal to the one or more light emitting sections, wherein
    the one or more light emitting sections each blink in a cycle corresponding to the applied voltage.

4. The aircraft according to claim 1, wherein
    the cowl member comprises a first cowl and a second cowl, the first cowl surrounding a fan included in the engine main body, and the second cowl surrounding an engine core included in the engine main body, and
    the one or more light emitting sections are disposed inside at least one of the first cowl and the second cowl.

5. The aircraft according to claim 1, further comprising a push mechanism that is disposed near a lower end of the engine nacelle, the push mechanism pushing the cowl member located on an airframe side of the engine nacelle and the cowl member located on an outer side of the engine nacelle to expand a space between the cowl members.

6. The aircraft according to claim 1, wherein
    the locking part includes a handle that is operated to lock the cowl member, and
    the one or more light emitting sections are disposed on a rear side of the handle in addition to inside the cowl member, the rear side of the handle being exposed when the cowl member is not locked.

7. The aircraft according to claim 1, wherein the one or more light emitting sections are disposed in a vicinity of a leading edge of the cowl member or in a vicinity of a trailing edge of the cowl member or both.

8. The aircraft according to claim 1, wherein the one or more light emitting sections are disposed over a predetermined range in a circumferential direction including a position of a diameter of the engine nacelle in a horizontal direction or a vicinity of the position.

9. The aircraft according to claim 1, wherein
    the one or more light emitting sections are connected with a power supply through a switch, the switch being put into an ON state when a load of the airframe is applied to a leg, and
    the one or more light emitting sections are turned on when the switch is in the ON state, and are turned off when the switch is in an OFF state.

10. An aircraft, comprising:
    an engine that includes an engine main body and an engine nacelle, the engine main body outputting thrust force, and the engine nacelle surrounding the engine main body;
    an engine pylon that supports the engine main body to an airframe, and axially supports a cowl member to be openable, the cowl member configuring the engine nacelle;
    a locking part that locks the cowl member of the engine nacelle in a closed state; and
    one or more light emitting sections that are disposed inside the cowl member and show an unlocked state of the cowl member, wherein
    the one or more light emitting sections are connected with a power supply through a switch, the switch being put into an ON state when a load of the airframe is applied to a leg, and the one or more light emitting sections are turned on when the switch is in the ON state, and are turned off when the switch is in an OFF state.

11. The aircraft according to claim 10, wherein the one or more light emitting sections are disposed in a vicinity of a leading edge of the cowl member or in a vicinity of a trailing edge of the cowl member or both.

12. An aircraft engine attached to an aircraft, the engine comprising:
an engine main body that outputs thrust force; and
an engine nacelle that surrounds the engine main body, wherein
the engine nacelle includes a cowl member, a locking member, and a light emitting section, the cowl member being axially supported to be openable by an engine pylon of the aircraft and surrounding the engine main body, the locking member locking the cowl member in a closed state, and the light emitting section being disposed inside the cowl member and showing an unlocked state of the cowl member,
wherein the unlocked state of the cowl member becomes visible by light emitted from the one or more light emitting sections and visible from an outside of the engine nacelle through a gap generated on an inner circumference of the cowl member when the cowl member is not locked.

13. The aircraft engine according to claim 12, wherein
the cowl member comprises a first cowl and a second cowl, the first cowl surrounding a fan included in the engine main body, and the second cowl surrounding an engine core included in the engine main body, and
the one or more light emitting sections are disposed inside at least one of the first cowl and the second cowl.

14. An aircraft engine nacelle, comprising:
a cowl member that is axially supported to be openable by an engine pylon of an aircraft and surrounds an engine main body;
a locking member that locks the cowl member in a closed state; and
a light emitting section that is disposed inside the cowl member and emits light outside through a gap generated on an inner circumference of the cowl member when the locking member is not locked.

15. The aircraft engine nacelle according to claim 14, further comprising a circuit section that applies a pulse-form voltage signal to the one or more light emitting sections, wherein
the one or more light emitting sections each blink in a cycle corresponding to the applied voltage.

16. The aircraft engine nacelle according to claim 14, further comprising a push mechanism that is disposed near a lower end of the engine nacelle, the push mechanism pushing the cowl member located on an airframe side of the engine nacelle and the cowl member located on an outer side of the engine nacelle to expand a space between the cowl members.

17. The aircraft engine nacelle according to claim 14, wherein
the locking part includes a handle that is operated to lock the cowl member, and
the one or more light emitting sections are disposed on a rear side of the handle in addition to inside the cowl member, the rear side of the handle being exposed when the cowl member is not locked.

18. The aircraft engine nacelle according to claim 14, wherein the one or more light emitting sections are disposed over a predetermined range in a circumferential direction including a position of a diameter of the engine nacelle in a horizontal direction or a vicinity of the position.

* * * * *